US007822834B2

(12) United States Patent
Kawai et al.

(10) Patent No.: US 7,822,834 B2
(45) Date of Patent: Oct. 26, 2010

(54) WIRELESS COMMUNICATION SYSTEM FOR EXCHANGING SIGNALS BETWEEN COMPUTER AND DEVICE AND COMPUTER AND DEVICE USED IN SUCH SYSTEM

(75) Inventors: Sunao Kawai, Toyoake (JP); Koshi Fukazawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1183 days.

(21) Appl. No.: 11/442,955

(22) Filed: May 31, 2006

(65) Prior Publication Data

US 2006/0268805 A1    Nov. 30, 2006

(30) Foreign Application Priority Data

May 31, 2005    (JP)    ............................. 2005-159969

(51) Int. Cl.
   G06F 15/177    (2006.01)
(52) U.S. Cl. .................. 709/221; 709/220; 709/222; 709/227
(58) Field of Classification Search ................ 709/221, 709/220, 222, 227
   See application file for complete search history.

(56) References Cited

U.S. PATENT DOCUMENTS

| 2002/0037699 | A1 | 3/2002 | Kobayashi et al. | |
| 2003/0091015 | A1 | 5/2003 | Gassho et al. | |
| 2006/0105714 | A1* | 5/2006 | Hall et al. ................. | 455/41.3 |
| 2006/0168647 | A1* | 7/2006 | Chiloyan ....................... | 726/4 |

FOREIGN PATENT DOCUMENTS

| JP | 2002-101104 A | 4/2002 |
| JP | 2003 143156 | 5/2003 |
| JP | 2003-218730 A | 7/2003 |
| JP | 2003-338821 A | 11/2003 |
| JP | 2004-173162 A | 6/2004 |
| WO | 2004/027445 A1 | 4/2004 |

(Continued)

OTHER PUBLICATIONS

Buffalo Technology, Inc. "Airstation One-Touch Secure System (AOSS)," Oct. 2004, pp. 1-7.*

(Continued)

*Primary Examiner*—Larry Donaghue
*Assistant Examiner*—Nicholas Taylor
(74) *Attorney, Agent, or Firm*—Baker Botts L.L.P.

(57) ABSTRACT

A communication system includes a computer and a device. The computer includes a signal transmission unit to output a signal by wireless communication in accordance with a first wireless setting, and a setting data sending unit to transmit a second wireless setting data to the device in accordance with the first wireless setting. The device includes a detection unit to detect the signal output while changing a wireless setting for the device, a replying unit to return identification data corresponding to the source of the signal in accordance with a wireless setting used after detection of the signal, a receiving unit to receive the second wireless setting data in accordance with the wireless setting used after detection of the signal, after the replying unit transmits the identification data, and a setting unit makes the wireless setting in accordance with the second wireless setting data.

19 Claims, 7 Drawing Sheets

FOREIGN PATENT DOCUMENTS

WO      2005034536 A1    4/2005

OTHER PUBLICATIONS

Buffalo Technology (USA), Inc., AirStation One-Touch Secure System (AOSS™), Oct. 2004.

Broadcom Corporation, Securing Home Wi-Fi® Networks: A Simple Solution Can Save Your Identity, May 18, 2005.

European Patent Office, European Search Report for Related Application No. EP 06252761.9 dated Jan. 22, 2007.

State Intellectual Property Office, Notification of the First Official Action in Chinese Patent Appl'n No. 2006100850092 (counterpart to above-captioned U.S. patent appl'n), issued Nov. 30, 2007.

Japanese Patent Office, Notification of Reasons of Rejection in Japanese Patent Appl'n No. 2005-159969, dated Dec. 18, 2007.

* cited by examiner

WIRELESS COMMUNICATION SYSTEM FOR EXCHANGING SIGNALS BETWEEN COMPUTER AND DEVICE AND COMPUTER AND DEVICE USED IN SUCH SYSTEM

CROSS-REFERENCE TO RELATED APPLICATION

This application claims priority under 35 U.S.C. §119 from Japanese Patent Application No. 2005-159969, filed on May 31, 2005. The entire subject matter of the application is incorporated herein by reference.

FIELD

Aspects of the present invention relate to a wireless communication system in which a computer and a device are connected to each other through wireless communications.

BACKGROUND

Sometimes, a user of a computer participating in a wireless network needs to newly add a device such as a printer to the wireless network. In such a situation, the following user operations are required. First, the user operates the user's computer to change setting for wireless communications to an initial state so as to enable the user's computer to temporarily establish a wireless connection with the printer. After the temporal wireless connection is established, the user further operates the computer to send predetermined setting data for wireless communications to the printer. Next, the user operates the printer so as to apply the predetermined setting data transmitted from the computer to the printer, so that a proper wireless connection can be established between the computer and the printer. An example of such a wireless communication system is disclosed in Japanese Patent Provisional Publication No. 2003-143156.

The above mentioned setting method for newly adding a device to the wireless network requires the user to operate the device to adjust setting for wireless communications in accordance with the setting data of the user's computer in addition to requiring the user to operate the user's computer to change the setting to an initial state. Such user operations are very troublesome for the user. If the user is not familiar with wireless networks, such user operations are very difficult for the user.

SUMMARY

Aspects of the present invention are advantageous in that a communication system, configured to simplify a user operation for configuring setting for a wireless connection between a computer and a device in the communication system, is provided.

BRIEF DESCRIPTION OF THE ACCOMPANYING DRAWINGS

DETAILED DESCRIPTION

General Overview

Figure 1:
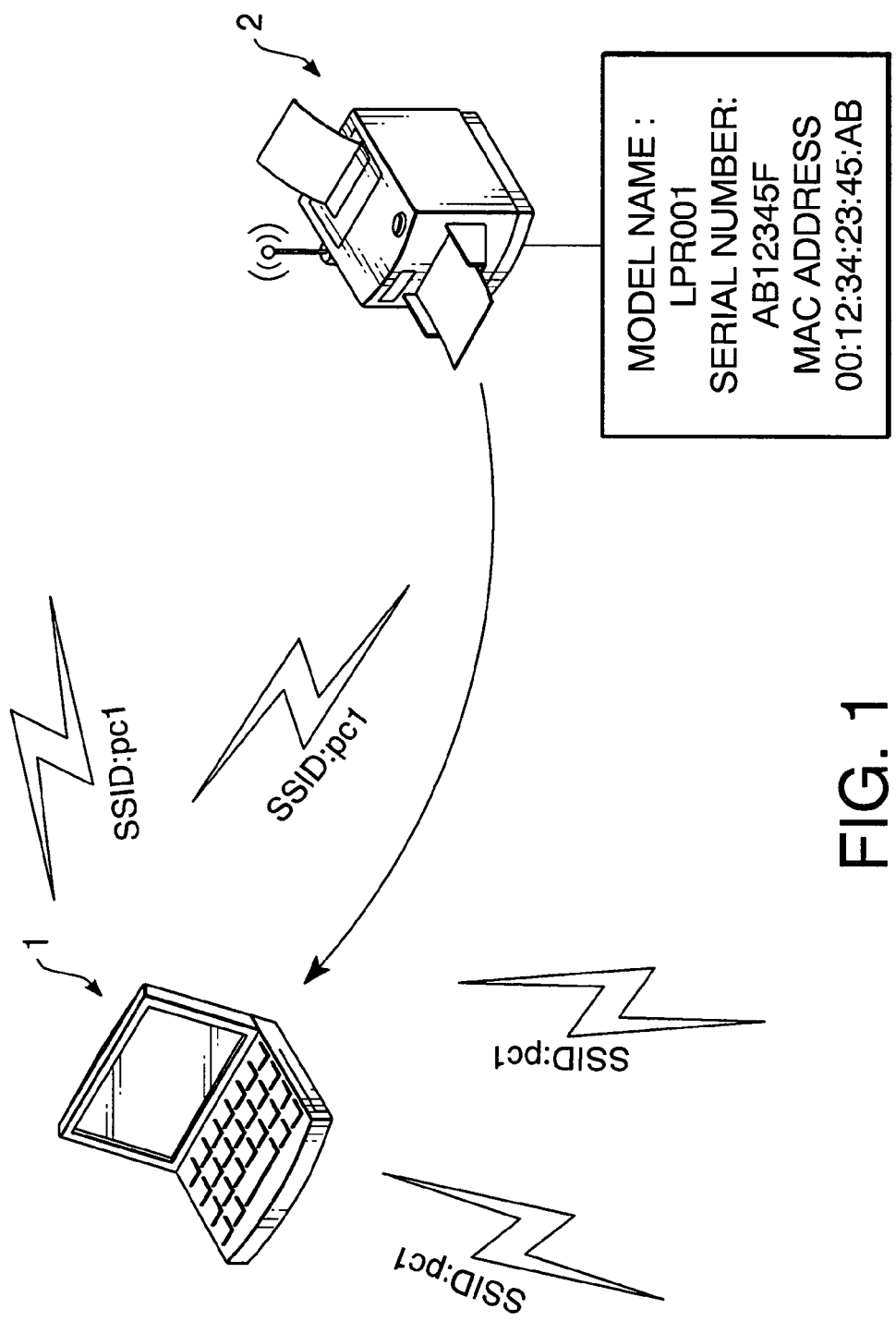
FIG. 1 illustrates a system configuration of a communication system in accordance with an example of the invention.

According to an aspect of the invention, there is provided a communication system comprising a computer and a device capable of performing wireless communication with each other. In this system, the computer comprises a signal transmission unit configured to output a signal by wireless communication accordance with a first wireless setting, and a setting data sending unit configured to transmit a second wireless setting data to the device in accordance with the first wireless setting if the device returns identification data of the device to the computer as a response to the signal output by the signal transmission unit. The device comprises a detection unit configured to detect the signal output by the computer, a wireless setting changing unit configured to change a wireless setting for the device while the detection unit detecting the signal, a replying unit configured to return the identification data of the device to the computer corresponding to the source of the signal in accordance with a wireless setting used when the detection unit has detected the signal, a receiving unit configured to receive the second wireless setting data from the computer in accordance with the wireless setting used when the detection unit has detected the signal, after the replying unit transmits the identification data, and a setting unit configured to make wireless setting of the device in accordance with the second wireless setting data received by the receiving unit.

With this configuration, wireless setting which is the same as that of the computer can be easily set to the device, without requiring a user to operate the computer to adjust setting for wireless communication to an initial state and to operate the device to change the wireless setting of the device to coincide with the wireless setting of the computer.

Although the computer and the device can communicate with each other using data contained in a received radio wave even if security setting such as authentication and an encryption scheme are not defined in the wireless setting of the computer and the device (i.e., the computer and the device can communicate with each other even if the same setting are not set to both of the computer and the device), wireless communication retaining security can be attained by applying the same wireless setting comprising security setting (e.g., authentication and an encryption scheme) to both of the computer and the device.

In an example, the signal may indicate that the computer is running.

In another example, the signal may indicate that the computer is in a process of preparing the second wireless setting.

By receiving the signal, the device is able to recognize that the computer is in a process of preparing the second wireless setting. The device is able to make wireless setting in response to the signal from the computer. Therefore, it becomes possible to reliably apply proper wireless setting to the computer and the device in the communication system.

Optionally, the computer may comprise an input unit configured to allow a user to input instruction, and a transmission command reception unit configured to receive a transmission command inputted as the instruction by the user through the input unit and to pass the transmission command to the signal transmission unit. In this case, the signal transmission unit may output the signal if the transmission command is passed thereto from the transmission command reception unit.

Such a configuration provides a user with flexibility of being able to start to make wireless setting for the computer and the device at a desirable time.

Still optionally, the computer may comprises an input unit configured to allow a user to input instruction, and a setting value generation unit configured to generate the second wireless setting in accordance with the instruction inputted by the user through the input unit.

Such a configuration provides a user with flexibility of being able to input desirable setting values for the wireless setting.

Still optionally, the computer may comprise an automatic setting value generation unit configured to automatically generate the second wireless setting.

Such a configuration eases a user operation for making wireless setting for the computer and the device.

Still optionally, the automatic setting value generation unit may generate the second wireless setting in accordance with a preset wireless setting which is preset to the computer.

With this configuration, it becomes possible for the computer to communicate with another device configured to perform wireless communication using wireless setting corresponding to the preset wireless setting of the computer.

Still optionally, the computer may comprise a display on which information is displayed, and a display control unit configured to display information representing a source of the identification data using the identification data transmitted from the device.

Such a configuration provides a user with flexibility of being able to check a target device to which the user wants to set wireless setting.

Still optionally, the setting data sending unit may be configured such that if more than one device returns the identification data to the computer, the setting data sending unit transmits the second wireless setting data to each of the more than one device.

With this configuration, it becomes possible to apply wireless setting to more than one device concurrently.

Still optionally, the wireless communication may provide a plurality of channels. In this case, the detection unit may detect the signal while switching the plurality of channels from one to another.

Since the detection unit detects the signal while switching the plurality of channels from one to another, it is possible to reliably make wireless setting for the computer and the device regardless of a channel through which the wireless communication is performed.

Still optionally, the device may support a plurality of wireless communication standards. In this case, the detection unit may detect the signal while switching the plurality of wireless communication standards from one to another.

With this configuration, it becomes possible to reliably make wireless setting for the computer and the device regardless of the type of a wireless communication standard being used.

Still optionally, the device may comprise a device side input unit configured to allow a user to input instruction. In this case, the detection unit may start to detect the signal in accordance with the instruction inputted by the input unit.

Such a configuration provides a user with flexibility of being able to start to make wireless setting for the computer and the device at a desirable time.

Still optionally, the device may comprise a device side input unit configured to allow a user to input instruction. In this case, the setting unit may start to make wireless setting of the device in response to the instruction being inputted by the input unit.

Such a configuration enables a user to confirm a device to which the wireless setting are to be applied. Therefore, it is possible to reliably apply wireless setting to a desired device.

Still optionally, the device may comprise a state indication unit configured to indicate whether the detection unit of the device is operating.

In a first example, the state indication unit may further indicate distinctively whether the receiving unit is operating.

With this configuration, the user is able to confirm a device to which the wireless setting are to be applied.

In a second example, the state indication unit may further indicate distinctively whether the detection unit detects the signal output by the computer.

Such a configuration enables a user to confirm a device to which the wireless setting are to be applied and to recognize that the device has successfully communicated with the computer.

In a third example, the state indication unit may further indicate distinctively whether the receiving unit receives the second wireless setting data from the computer.

With this configuration, the user is able to recognize that the device, to which the wireless setting are to be applied, has successfully received the wireless settings data from the computer.

According to another aspect of the invention, there is provided a computer having a function of performing wireless communication with a device in a communication system. The computer is provided with a signal transmission unit configured to output a signal by wireless communication in accordance with a first wireless setting, and a setting data sending unit configured to transmit second wireless setting data to the device in accordance with the first wireless setting if the device returns identification data of the device to the computer as a response to the signal output by the signal transmission unit.

With this configuration, wireless setting which is the same as that of the computer can be easily set to the device, without requiring a user to operate the computer to adjust setting for wireless communication to an initial state and to operate the device to change the wireless setting of the device to coincide with the wireless setting of the computer.

According to another aspect of the invention, there is provided a device having a function of performing wireless communication with a computer in a communication system. The device is provided with a detection unit configured to detect a signal which is output by the computer and represents at least a source of the signal, while changing a wireless setting for the device, a replying unit configured to transmit identification data of the device return to the computer corresponding to the source of the signal in accordance with a wireless setting used when the detection unit has detected the signal, a receiving unit configured to receive second wireless setting data from the computer in accordance with the wireless setting used when the detection unit has detected the signal, after the replying unit transmits the identification data, and a setting unit configured to make wireless setting of the device in accordance with the second wireless setting data received by the receiving unit.

With this configuration, wireless setting which is the same as that of the computer can be easily set to the device, without requiring a user to operate the computer to adjust setting for wireless communication to an initial state and to operate the device to change the wireless setting of the device to coincide with the wireless setting of the computer.

According to another aspect of the invention, there is provided a computer program product comprising computer readable instructions to be executed by a computer capable of performing wireless connection with a device in a communication system. The instructions cause the computer to function as a signal transmission unit configured to output a signal by wireless communication in accordance with a first wireless setting, and a setting data sending unit configured to transmit a second wireless setting data to the device in accordance with the first wireless setting if the device returns identification data of the device to the computer as a response to the signal output by the signal transmission unit.

With this configuration, wireless setting which is the same as that of the computer can be easily set to the device, without requiring a user to operate the computer to adjust setting for wireless communication to an initial state and to operate the device to change the wireless setting of the device to coincide with the wireless setting of the computer.

According to another aspect of the invention, there is provided a computer program product comprising computer readable instructions to be executed by a computer capable of performing wireless connection with an external computer in a communication system. The instructions cause the computer to function as a detection unit configured to detect a signal which is output by the external computer and represents at least a source of the signal, while changing a wireless setting for the computer, a replying unit configured to return identification data of the computer to the external computer corresponding to the source of the signal in accordance with a wireless setting used when the detection unit has detected the signal, a receiving unit configured to receive second wireless setting data from the external computer in accordance with the wireless setting used when the detection unit has detected the signal, after the replying unit transmits the identification data, and a setting unit configured to make wireless setting of the computer in accordance with the second wireless setting data received by the receiving unit.

With this configuration, the wireless setting can be easily set to both of the computer and the external computer, without requiring a user to operate the external computer to adjust setting for wireless communication to an initial state and to operate the computer to change the wireless setting of the computer to coincide with the wireless setting of the external computer.

The device and method according to the present invention can be realized when appropriate programs are provided and executed by a computer. Such programs may be stored in recording medium such as a flexible disk, CD-ROM, memory cards and the like and distributed. Alternatively or optionally, such programs can be distributed through networks such as the Internet.

ILLUSTRATIVE EXAMPLES

Hereafter, an illustrative example according to the invention will be described with reference to the accompanying drawings.

FIG. 1 illustrates a system configuration of a communication system 100 according to an illustrative example of the invention. As shown in FIG. 1, a PC (personal computer) 1 and an MFD (multifunction device) 2 are provided in the communication system 100. The MFD 2 is configured to have multiple functions comprising a printing function and a scanner function. Although in FIG. 1 only one multifunction device is illustrated, more than one multifunction device may be provided in the communication system 100. The PC 1 is connected to a wireless LAN (local area network) in which "pc1" is used as a SSID (Service Set Identifier).

The SSID is an identifier used to enable devices using the same SSID to communicate with each other in a wireless LAN. Since an SSID flows in a wireless network if the SSID is not concealed in accordance with security setting, it is possible for a device in the wireless LAN to obtain the SSID flowing through the wireless LAN and to communicate with another device by using the obtained SSID. In a wireless LAN, a device not having an SSID is allowed to communicate with another device having an SSID although in this case security of wireless communications can not be retained. Accordingly, even if the PC 1 does not have the same SSID as that of the MFD 2, the PC 1 is able to establish a wireless connection with the MFD 2 by receiving a radio wave of the wireless LAN.

A model name, a serial number and a MAC (Media Access Control) address are stored in the MFD 2 as identification data. In this example, the model name is "LPR001", the serial number is "AB12345F", and the MAC address is "00:12:34:23:45:AB".

Figure 2:
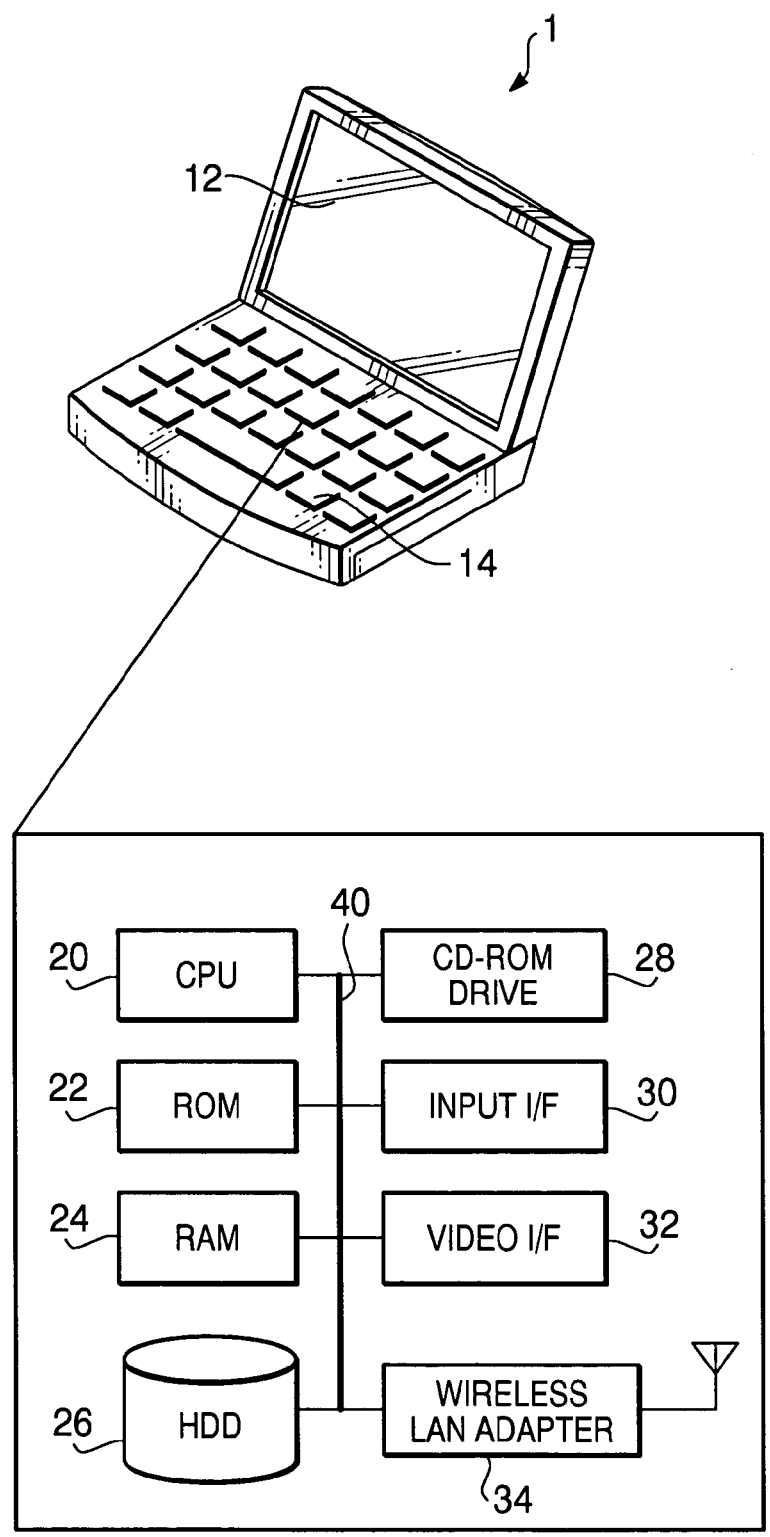
FIG. 2 shows an outer appearance and a block diagram of a personal computer in the communication system.

FIG. 2 shows an outer appearance and a block diagram of the PC 1. As shown in FIG. 2, the PC 1 is a notebook-sized personal computer having a main body integrally provided with a display 12 and a keyboard 14. The PC 1 comprises a CPU 20 which controls various functions of the PC 1, a ROM 22 storing various programs, such as BIOS to be executed by the CPU 20 in a boot-up process, a RAM 24 to be used as a work memory by the CPU 20, an HDD (hard disk drive) 26 storing various files comprising files of an operating system, a CD-ROM drive 28 for reading data from a CD, an input interface (I/F) 30 configured to input an input signal from a keyboard 14 or a mouse (not shown) connected to the PC 1 to the CPU 20, a video interface (I/F) 32 configured to display information on the display 12 under control of the CPU 20, and a wireless LAN adapter 34 configured to interface the PC 1 with an external device through a wireless connection in accordance with wireless communication standards (IEEE802.11 in this example). These components are connected to each other via a bus 40.

Figure 3:
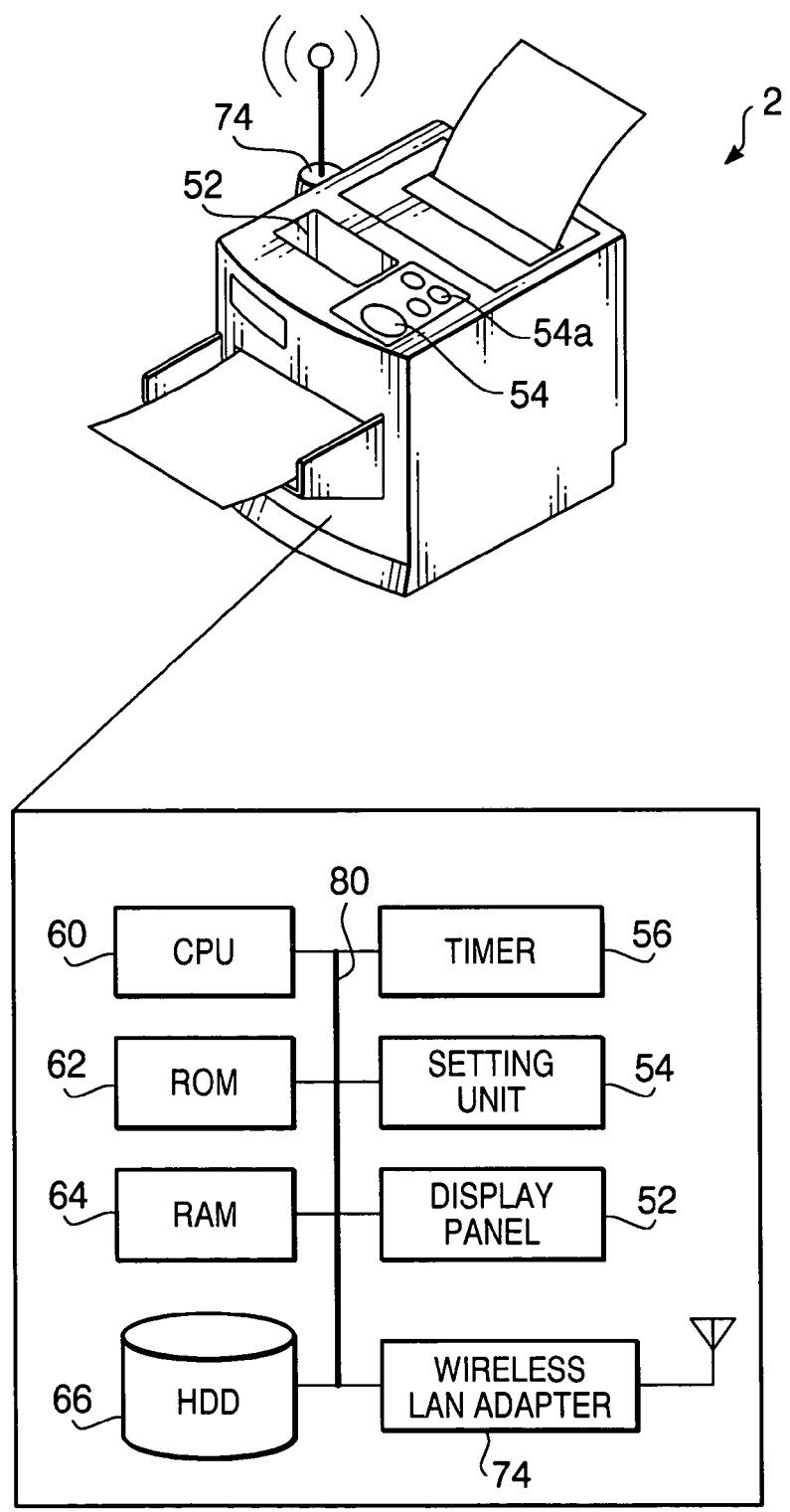
FIG. 3 shows an outer appearance and a block diagram of a multifunction device in the communication system.

FIG. 3 shows an outer appearance and a block diagram of the MFD 2. As shown in FIG. 3, the MFD 2 comprises a CPU 60 which controls various functions of the MFD 2, a ROM 62 storing various programs, such as BIOS to be executed by the CPU 60 in a boot-up process, a RAM 64 to be used as a work memory by the CPU 60, an HDD (hard disk drive) 66 storing various programs to be executed by the CPU 60, a display panel 52 on which information is displayed, a setting unit 54 through which a user is able to input instruction into the MFD 2, a timer 56, and a wireless LAN adapter 74 configured to interface the MFD 2 with an external device through a wireless connection in accordance with wireless communication standards (IEEE802.11 in this example). These components are connected to each other via a bus 80.

Figure 4:
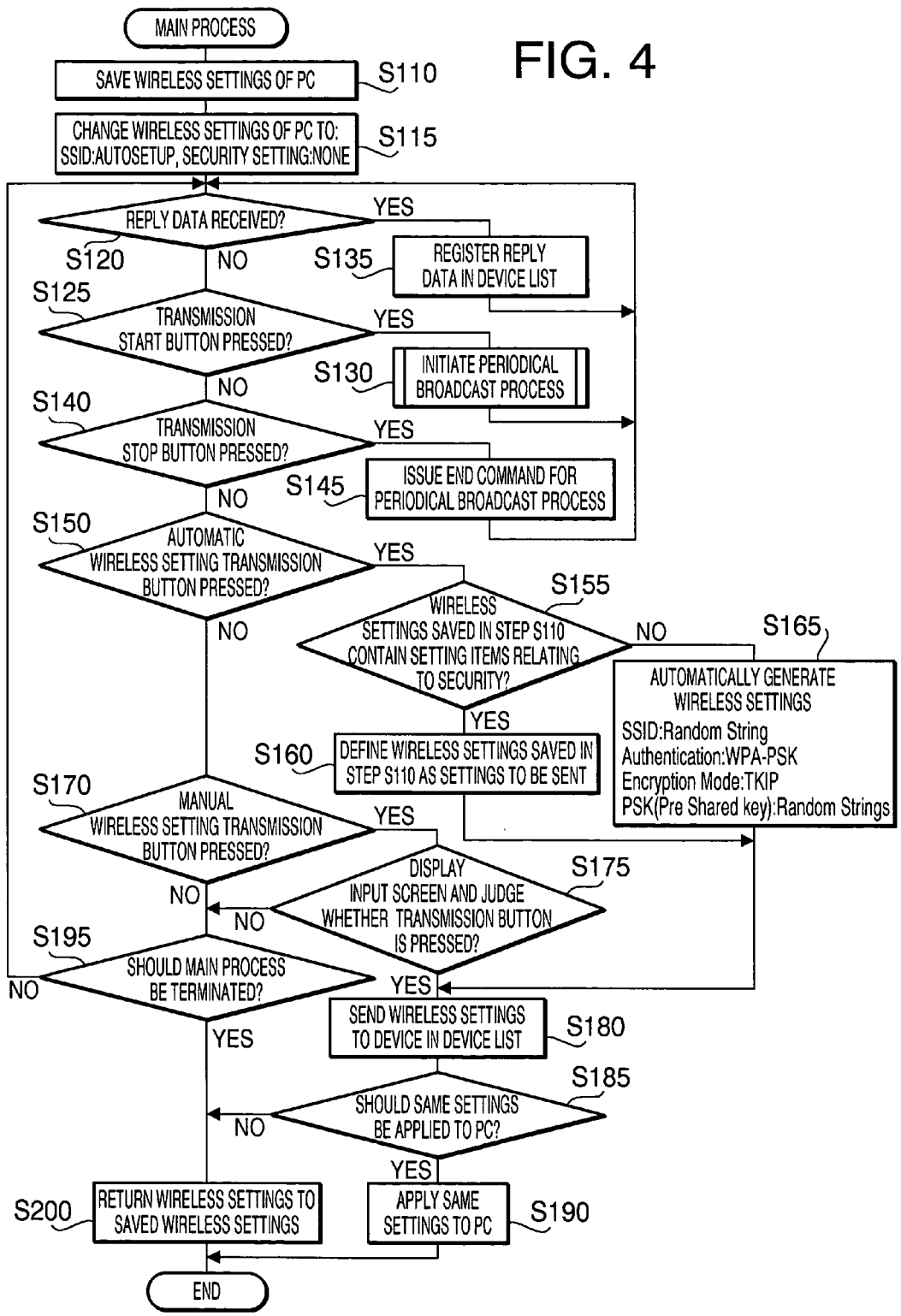
FIG. 4 is a flowchart illustrating a main process to be executed by the personal computer.

Hereafter, operations of the PC 1 and the MFD 2 will be described. FIG. 4 is a flowchart illustrating a main process to be executed under control of the CPU 20 of the PC 1. For example, the main process may be initiated when a CD-ROM storing a main program for the main process is inserted into the CD-ROM drive 28 and the main program is read into the PC 1. The main program may be copied in the HDD 26 in advance so that the main process can be initiated by a user operation conducted by the user through the keyboard 14.

When the main process is initiated, an application screen (e.g., a screen illustrated in FIG. 5A) is displayed on the display 12. In step S110, the CPU 20 saves setting data for wireless communications (hereafter, referred to as wireless setting) currently set to the PC 1. For example, the CPU 20 saves the current wireless setting data in the RAM 24 or the HDD 26.

Next, in step S115, the CPU 20 configures wireless setting. Specifically, the CPU 20 sets an SSID for "AUTOSETUP", and security setting for "none". If the security setting is set for "none", wireless communications are performed without retaining security. By setting the security setting for "none", the PC 1 is allowed to perform wireless communications with the MFD 2 having wireless setting not coinciding with the wireless setting of the PC 1.

Next, in step S120, the CPU 20 judges whether replay data from the MFD 2 is received. The reply data contains identification data of the MFD 2, such as a model name, a serial number, and a MAC address of the MFD 2. As described later, the reply data is transmitted from the MFD 2 after the MFD 2 receives a message packet which has been transmitted (in step S210) by the PC 1 without designating a destination of the packet in a periodical broadcast process initiated in step S130.

If it is judged in step S120 that the reply data is not received (S120: NO), control proceeds to step S125 where the CPU 20 judges whether a transmission start button 12a for starting transmission of a message packet is pressed on the application screen. The message packet is a packet to be transmitted in step S210 of FIG. 7 from the PC 1 to the MFD 2 so as to notify the MFD 2 that the PC 1 is able to send data regarding wireless setting for retaining security (i.e., setting for performing wireless communications while retaining security). Hereafter, wireless setting by which security is retained are referred to as "security wireless setting". The message packet contains a particular string indicating that the PC 1 is searching for the MFD 2.

If the transmission start button 12a is pressed (S125: YES), control proceeds to step S130 where the periodical broadcast process is initiated (see FIG. 7). After the periodical broadcast process is initiated, control returns to step S120. If the CPU 20 receives the reply data from the MFD 2, control proceeds to step S135 where the CPU 20 adds the identification data contained in the reply data to a device list which stores information regarding devices (MFDs 2). That is, the identification data is stored in a predetermined area in the RAM 24 or the HDD 26.

Figure 5A:
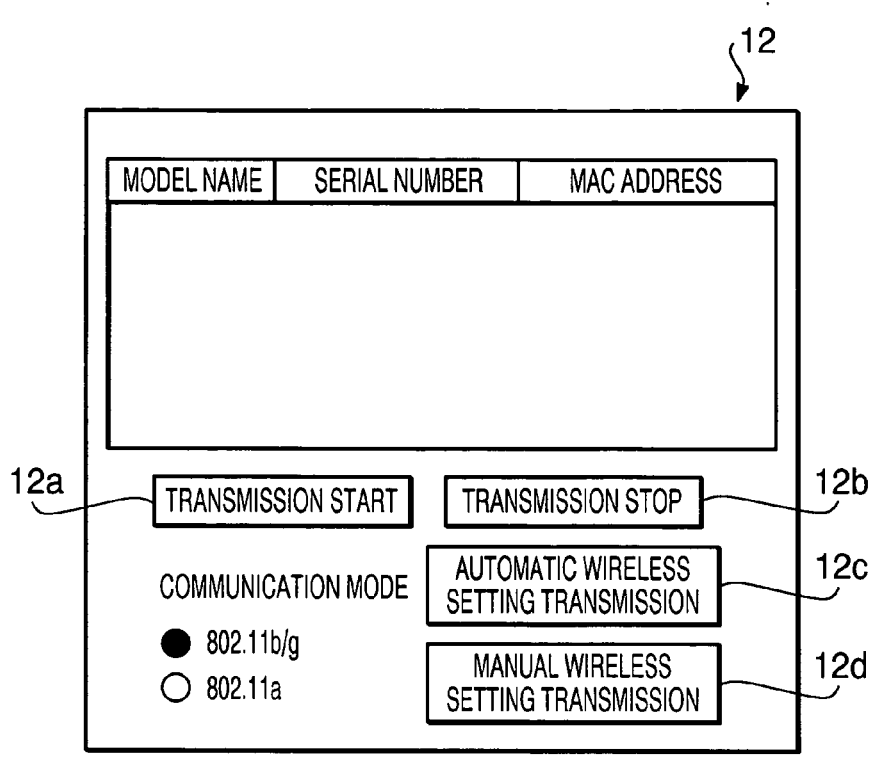
FIGS. 5A and 5B illustrate application screens to be display on the personal computer.
Figure 5B:
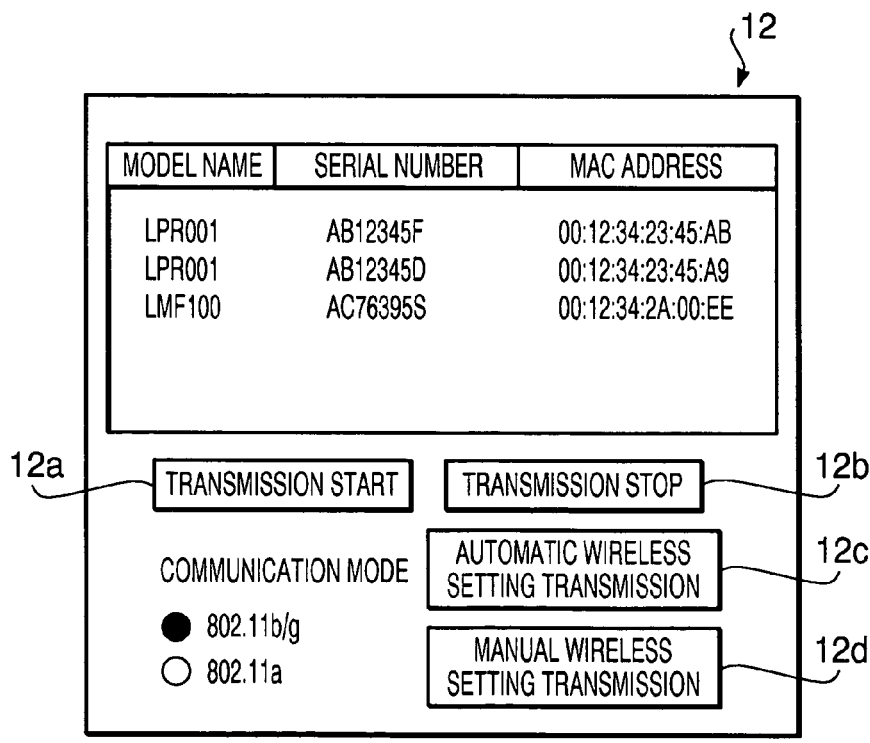

In this stage, model names, serial numbers and MAC addresses of devices (MFDs 2) for which the reply data are received by the PC 1 are displayed on the display 12 of the PC 1 as shown in FIG. 5B. After step S135 is finished, control returns to step S120. The MFD 2 which has returned the reply data to the PC 2 is thus added to the device list.

If it is judged in step S125 that the transmission start button 12a is not pressed (S125: NO), control proceeds to step S140 where the CPU 20 judges whether a transmission stop button 12b (see FIGS. 5A and 5B) is pressed. If the transmission stop button 12b is pressed (S140: YES), control proceeds to step S145 where the periodical broadcast process initiated in step S130 is terminated. It should be noted that the application screen shown in FIGS. 5A and 5B is configured such that the transmission button 12b is not selectable (i.e., the user is not able to press the button 12b) if the periodical broadcast process has not been initiated.

If it is judged in step S140 that the transmission stop button 12b is not pressed (S140: NO), control proceeds to step S150 where the CPU 20 judges whether an automatic wireless setting transmission button 12c is pressed. By pressing the automatic wireless setting transmission button 12c, the user is able to cause the PC1 to perform a process for automatically generating security wireless setting in step S160 or S165.

If it is judged in step S150 that the automatic setting transmission button 12c is pressed (S150: YES), control proceeds to step S155 where the CPU 20 judges whether the wireless setting data saved in step S110 contain setting items relating to security and the setting items relating to security are configured to retain security. In other words, the CPU 20 judges whether the previous wireless setting data saved in step S110 indicate that wireless communication is to be performed while retaining security.

If the wireless setting data saved in step S110 contain setting items relating to security and the setting items relating to security are configured to retain security (step S155: YES), control proceeds to step S160 where the CPU 20 defines the wireless setting data saved in step S110 as setting data (i.e., security wireless setting) to be sent to the MFD 2. Then, control proceeds to step S180.

If the judgment result of step S155 is "NO", control proceeds to step S165 where the setting values for the wireless setting are generated automatically as indicated below.

SSID: Random String

Authentication Method: WPA (Wi-Fi Protected Access)-PSK (Pre Shared Key)

Network key: Random Strings

Encryption Mode: TKIP (Temporal Key Integrity Protocol)

For example, a program for generating a random string as a SSID key or a Network key may be stored in the CD-ROM together with the main program. In step S165, the program for generating a random string as a SSID key or a Network key is executed. After step S160 or S165 is processed, control proceeds to step S180.

If it is judged in step S150 that the automatic setting transmission button 12c is not pressed (S150: NO), control proceeds to step S170 where the CPU 20 judges whether a manual wireless setting transmission button 12d is pressed. By pressing the manual wireless setting transmission button 12d, the user is able to cause the PC 1 to generate setting values for security wireless setting in accordance with instruction inputted by the user (step S175).

Figure 6:
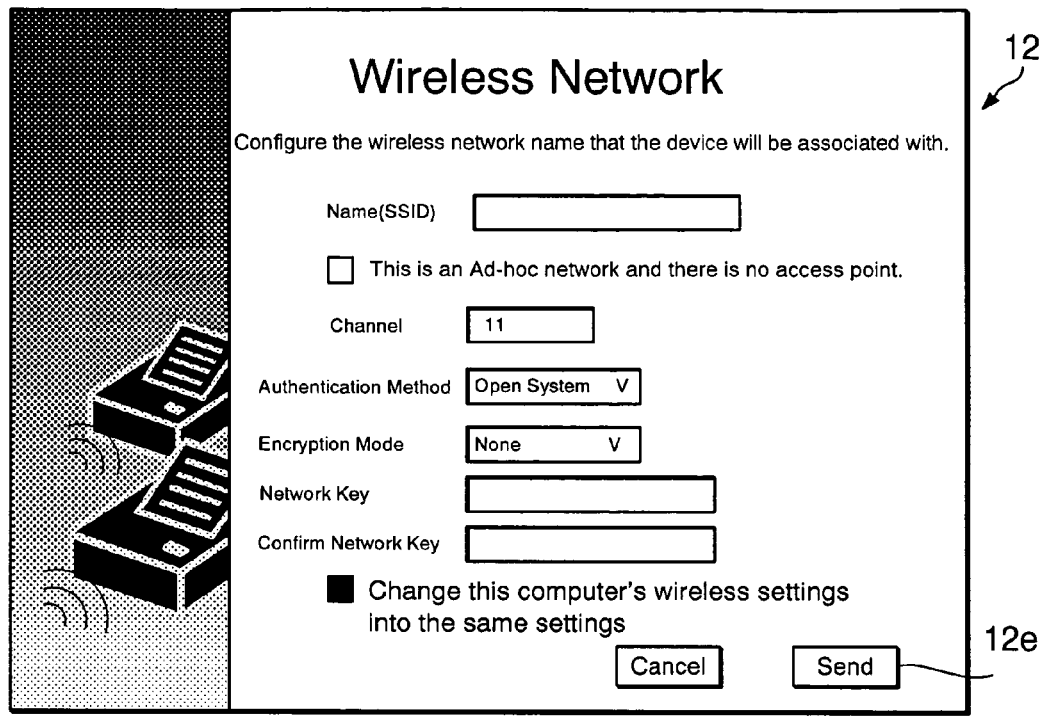
FIG. 6 illustrates an input screen to be display on the personal computer.

If it is judged in step S170 that the manual wireless setting transmission button 12d is pressed (S170: YES), control proceeds to step S175 where the CPU 20 displays an input screen for requesting the user to input setting values for security wireless setting on the display 12 (see FIG. 6). Further, in step S175, the CPU 20 judges whether a transmission button 12e for transmitting the security wireless setting data reflecting the setting values inputted by the user through the input screen is pressed. If the transmission button 12e is pressed (S175: YES), control proceeds to step S180.

In step S180, the security wireless setting defined in step S160 (i.e., the wireless setting saved in the HDD 26 at step S110), the security wireless setting automatically generated in step S165, or the security wireless setting generated in accordance with the setting values inputted by the user through the input screen is sent to the MFD 2. More specifically, in step S180, the security wireless setting data are sent to a target device selected by the user on the application screen shown in FIG. 5B.

Next, in step S185, the CPU 20 judges whether wireless setting identical with the security wireless setting data sent to the MFD 2 in step S180 should also be applied to the PC1. Specifically, in step S185, the CPU 20 judges that wireless setting identical with the security wireless setting data sent to the MFD 2 in step S180 should not be applied to the PC1 if the previous wireless setting data saved in step S160 can retain security (i.e., the previous wireless setting correspond to security wireless setting). The CPU 20 judges that wireless setting identical with the security wireless setting data sent to the MFD 2 in step S180 should be applied to the PC1 if the security wireless setting are automatically generated in step S165 or the user designates an item for applying wireless setting identical with the setting values set by the user on the input screen (see FIG. 6), to the PC 1.

If the CPU 20 judges that wireless setting identical with the security wireless setting data sent to the MFD 2 in step S180 should be applied to the PC1 (S185: YES), control proceeds to step S190 where wireless setting identical with the security wireless setting data sent to the MFD 2 in step S180 are set to the PC 1. Then, the main process terminates.

In the judgment result of step S170 or step S175 is "NO", control proceeds to step S195 where the CPU 20 judges whether the main process should be terminated. Specifically, in step S195, the CPU 20 judges whether the main process should be terminated by checking whether a stop button for terminating the main process (not shown) is pressed. If the CPU 20 judges that the main process should not be terminated (S195: NO), control returns to step S120.

If the CPU 20 judges that the main process should be terminated (S195: YES) or the judgment result of step S185 is "NO" (i.e., if the setting identical with the security wireless setting data sent to the MFD 2 should not be applied to the PC1), control proceeds to step S200. In step S200, the CPU 20 returns the wireless setting to the wireless setting data saved in step S110. Then, the main process terminates.

Figure 7:
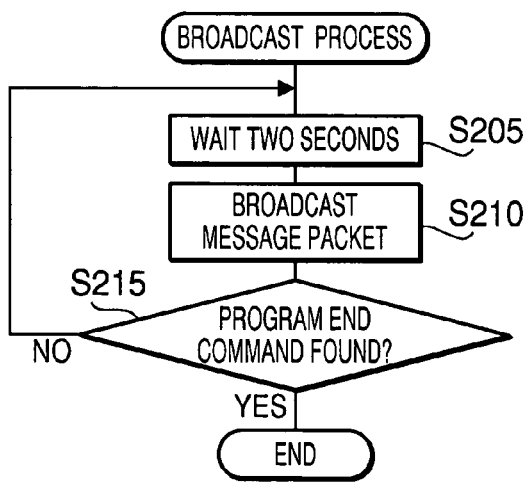
FIG. 7 is a flowchart illustrating a periodical broadcast process to be executed by the multifunction device.

Hereafter, the periodical broadcast process to be executed in step S130 of the main process under control of the CPU 20 of the PC 1 will be described with reference to FIG. 7. First, the CPU 20 waits 2 seconds (step S205). Then, the CPU 20 broadcasts a message packet (step S210). Next, the CPU 20 judges whether a program end command for terminating the periodical broadcast process exists (step S215). If the program end command exists (S215: YES), the periodical broadcast process terminates. If the program end command does not exist (S215: NO), control returns to step S205.

Figure 8:
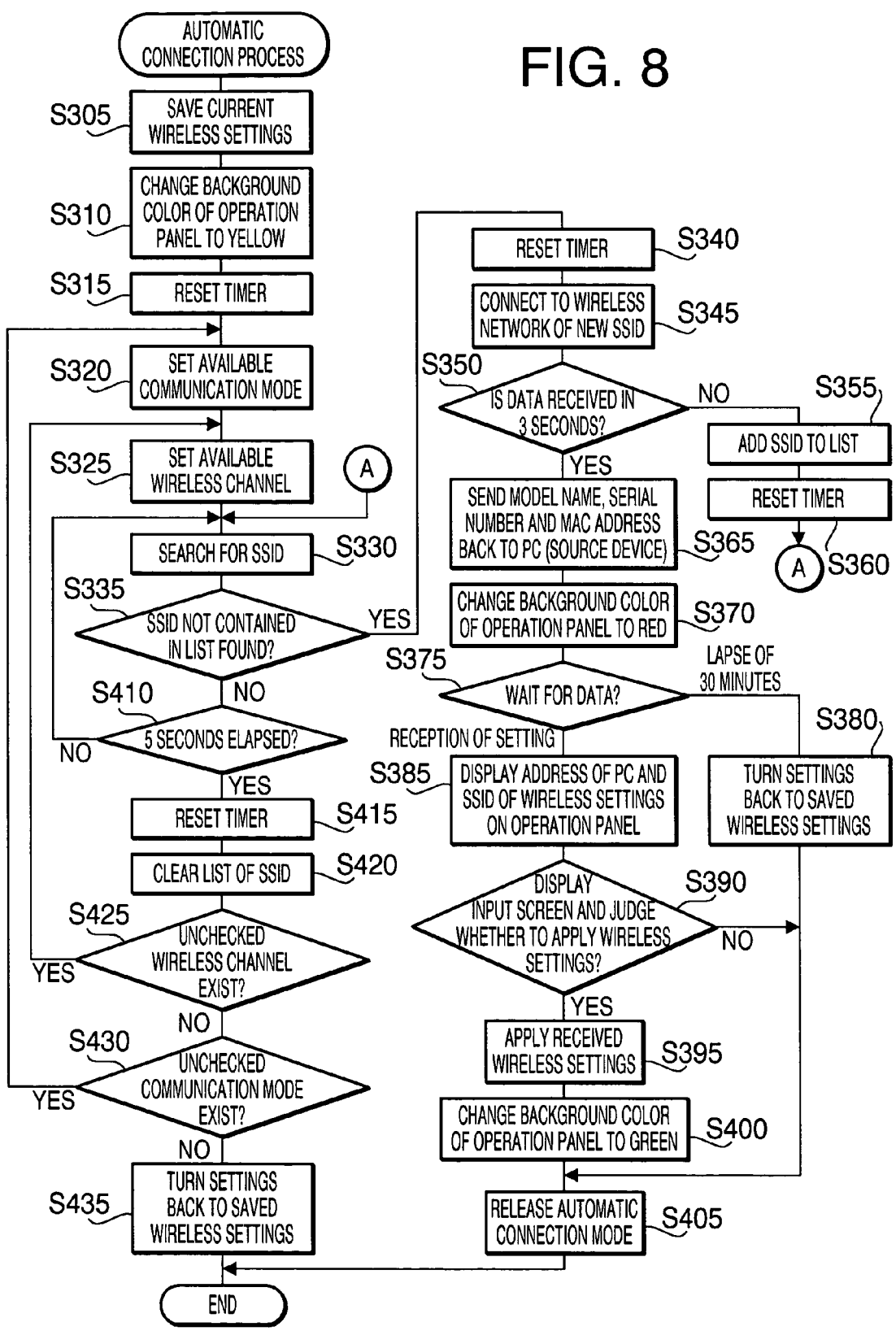
FIG. 8 is a flowchart illustrating an automatic connection process to be executed by the multifunction device.

FIG. 8 is a flowchart illustrating an automatic connection process to be executed under control of the CPU 60 of the MFD 2. As described below, the automatic connection process is a process for performing wireless communicates with the PC 1 and for applying the security wireless setting provided by the PC 1 to the MFD 2. The automatic connection process is initiated when a search button 54a provided in the setting unit 54 (see FIG. 3) is pressed.

First, the CPU 60 of the MFD 2 saves current wireless setting data (i.e., setting for performing wireless communications), for example, into the RAM 64 or the HDD 66 (step S305).

Next, the CPU 60 changes a background color of the display panel 52 to yellow so as to notify the user that the MFD 2 is in a state of executing the automatic connection process (step S310). It should be noted that various types of colors or patterns may be used as a background of the display panel 52 in step S310 as long as the color (or pattern) used as the background enables the user to recognize that the MFD 2 is in a state of executing the automatic connection process. Sound may be outputted to notify the user that the MFD 2 is in a state of executing the automatic connection process. Such variations regarding the notification for notifying the user that the MFD 2 is in a state of executing the automatic connection process may also be applied to steps S370 and S400.

In step S315, the CPU 60 resets the timer 56. Next, the CPU 60 sets a communication mode of wireless communications (step S320). In this example, the MFD 2 supports communication modes of IEEE 802.11b/g and IEEE 802.11a. For example, IEEE 802.11b/g may be defined as the communication mode in step S320.

Next, in step S325, the CPU 60 sets a wireless channel to be used for wireless communications. In this example, the number of available channels in the communication mode of IEEE 802.11b/g is 14, and the number of available channels in the communication mode of IEEE 802.11a is 4. Next, in step S330, the CPU 60 reads an SSID from a radio wave received using the wireless setting set in steps S320 and S325. As described later, if the CPU 60 newly finds an SSID, the found SSID is added to a certain area (e.g., a list) prepared in the RAM 64 or the HDD 66.

In step S335, the CPU 60 judges whether an SSID not comprised in the list is found. If an SSID not comprised in the list is found (S335: YES), control proceeds to step S340 where the CPU 60 resets the timer 56. Hereafter, such an SSID which is newly found in step S335 and is not comprised in the list is referred to as a "new SSID".

Next, in step S345, the CPU 60 operates to connect to a wireless LAN network defined by the new SSID. It should be noted that in the wireless communications performed between the wireless LAN network defined by the new SSID and the MFD 2, security is not retained.

Next, in step S350, the CPU 60 judges whether a certain type of data (a message packet) from the PC 1 is received in three seconds from a time when the timer 56 has reset in step S340. If the certain type of data is not received (S350: NO), the CPU 60 adds the new SSID to the list. Then, control proceeds to step S360 where the timer 56 is reset. Then, control returns to step S330.

If the certain type of data is received (S350: YES), control proceeds to step S365 where the CPU 60 sends the reply data containing the model name, the serial number and the MAC address of the MFD 2, to the PC 1 which is a source device of the message packet, as the identification data of the MFD 2. Next, in step S370, the CPU 60 changes the background color of the display panel 52 to red so as to notify the user that the MFD 2 is in a state in which the reply data has already sent to the PC 1 (i.e., in a state in which the MFD 2 waits for transmission of security wireless setting from the PC1).

In step S375, the CPU 60 waits until data is received. If security wireless setting are transmitted from the PC 1 or 30 minutes have elapsed from a time when the timer 56 was reset in step S340, control proceeds to a next step. If it is judged in step S375 that 30 minutes have elapsed (S375: Lapse of 30 minutes), control proceeds to step S380 where the CPU 60 turns the wireless setting of the MFD 2 back to the setting data saved in step S305. That is, the wireless setting data saved in step S305 is applied to the MFD 2. Then, control proceeds to step S405. In this case, the display panel 52 remains in red background color because step S400 is not processed. Therefore, in this case, the user is able to recognize that the MFD 2 does not operate to configure wireless setting.

If it is judged in step S375 that the security wireless setting have arrived from the PC 1 (S375: Reception of Setting), control proceeds to step S385 where the CPU 60 displays an IP address of the PC 1 which is a source of the security wireless setting and an SSID transmitted from the PC 1 as setting values of the security wireless setting, on the display panel 52.

Next, in step S390, the CPU 60 displays an input screen for requesting the user to input instruction on whether to apply the security wireless setting to the MFD 2, on the display panel 52. Further, the CPU 60 judges whether to apply the security wireless setting to the MFD 2 in accordance with user inputs.

If the CPU 60 judges that the security wireless setting should not be applied to the MFD 2 (S390: NO), control proceeds to step S405. If the CPU 60 judges that the security wireless setting should be applied to the MFD 2 (S390: YES), control proceeds to step S395 where the security wireless setting data received in step S375 is applied to the MFD 2 as setting for wireless communications. Next, in step S400, the CPU 60 changes the background color of the display panel 52 to green so as to notify the user that the security wireless setting data transmitted from the PC 1 have been successfully applied to the MFD 2. Then, control proceeds to step S405. In step S405, the CPU 60 resets the operation mode (i.e., the automatic connection mode) under which the process is executed from step S310 to step S400.

On the other hand, if a new SSID is not found (step S335: NO), control proceeds to step S410. In step S410, the CPU 60 judges whether 5 seconds has elapsed from a time when the timer 56 was reset in step S315. If 5 seconds has not elapsed (S410: NO), control returns to step S330. If 5 seconds has elapsed (S410: YES), control proceeds to step S415 where the CPU 60 resets the timer 56.

Next, in step S420, the CPU 60 clears the list containing SSIDs. Next, in step S425, the CPU 60 checks whether an unchecked wireless channel (i.e., a wireless channel not set in step S325) exists. If an unchecked wireless channel exists (S425: YES), control returns to step S325 to set one of unchecked channels. If an unchecked wireless channel does not exist (S425: NO), the CPU 60 judges whether an unchecked communication mode (i.e., a communication mode not set in step S320) exists (step S430). If an unchecked communication mode exists (S430: YES), control returns to step S320 to set one of unchecked communication modes.

If an unchecked communication mode does not exist (S430: NO), control proceeds to step S435 where the CPU 60 turns the wireless setting of the MFD 2 back to the wireless setting data saved in step S305. Then, the automatic connection process terminates.

As described above, in the communication system 100, the PC 1 sends a message packet notifying the MFD 2 that the PC 1 is ready for sending the security wireless setting which are wireless setting for retaining security, to the MFD 2 under a predetermined wireless setting (step S210). The MFD 2 searches for an SSID of the PC 1 (step S330) while changing wireless setting (steps S320 and S325). If a new SSID is found (S335: YES) and the MFD 2 becomes able to perform wireless communications with the PC 1 (S350: YES), the security wireless setting data are sent to the MFD 2 (step S180) and then the security wireless setting are set to the MFD 2 (S395).

Therefore, according to the example, it is possible to set the same wireless setting to both of the PC 1 and the MFD 2, thereby establishing a wireless connection, in which security is retained, between the PC 1 and the MFD 2. It is noted that such a wireless connection can be established without requesting a user operation to set wireless setting for both of the PC 1 and the MFD 2. Therefore, the user is able to easily make wireless setting for retaining security.

In the above mentioned example, if the transmission start button 12a is pressed by the user through the application screen displayed on the PC 1 (S125: YES), a message packet is sent to the PC 1, i.e., the PC 1 moves to a state where the PC 1 is able to send the security wireless setting to the MFD 2 (S210). Such a configuration provides a user with flexibility of being able to start to make wireless setting for the PC 1 and the MFD 2 at a desirable time.

In the above mentioned example, setting values of the security wireless setting are automatically generated in the PC 1 (steps S160 and S165). Such a configuration further eases a user operation for establishing a wireless connection retaining security between the PC 1 and the MFD 2.

In the above mentioned example, the security wireless setting are determined based on the user inputs (step S175). Such a configuration provides a user with flexibility of being able to input desirable setting values for the security wireless setting.

In the above mentioned example, the automatic connection process is initiated in the MFD 2 when the search button 54a of the setting unit 54 is pressed. Such a configuration provides a user with flexibility of being able to start wireless setting for the wireless communications between the MFD 2 and the PC 1 at a desirable time.

In the above mentioned example, if the MFD 2 receives a message packet from the PC 1 (S350: YES), the MFD 2 sends its own identification data to the PC 1 which sent the message packet (step S365). Then, the PC 1 displays information based on the received identification data on the display 12 (step S385), and enables a user to select one of devices (i.e., the MFD 2). Such a configuration provides a user with flexibility of being able to select a target device (the MFD 2) to which the user wants to set wireless setting.

Although the present invention has been described in considerable detail with reference to certain preferred examples thereof, other examples are possible.

In the above mentioned example, the communication system 100 is formed by the personal computer 1 and the MFD 2. However, a different type of computer such as a server or a terminal device may be used in the communication system 100 in place of the personal computer 1 by providing such a computer with the function of the personal computer 1. A different type of device such as a printer or a scanner may be used in the communication system 100 in place of the MFD 2 or in addition to the MFD 2 by providing such a device with the function of the MFD 2.

More than one multifunction device may be provided in the communication system 100. In this case, the PC 1 may be configured to send the security wireless setting data to more than one multifunction device at a time. Alternatively, the PC 1 may send the security wireless setting data sequentially to more than one multifunction device.

In the above mentioned example, the setting unit 54 of the multifunction device 2 is formed as a separate switch unit. However, the setting unit may be configured as a touch panel provided integrally with the display panel 52 to cover the top of the display panel 52.

What is claimed is:

1. A communication system comprising a computer and a device capable of performing wireless communication with each other, wherein the computer comprises:
   a signal transmission unit configured to output a signal by wireless communication in accordance with a first wireless setting and subsequently to output a message packet by wireless communication; and
   a setting data sending unit configured to transmit second wireless setting data to the device by wireless communication in accordance with the first wireless setting in response to the device returning identification data of the device to the computer as a response to the signal output by the signal transmission unit;

wherein the device comprises:
a detection unit configured to detect the signal output by the computer by wireless communication and subsequently to detect the message packet output by the computer by wireless communication;
a wireless setting changing unit configured to change a wireless setting for the device while the detection unit is detecting the signal;
a replying unit configured to return the identification data of the device to the computer corresponding to the source of the signal in accordance with a wireless setting when the signal and the message packet are detected by the detection unit and not to return the identification data when the signal is detected but the subsequent message packet is not detected by the detection unit;
a receiving unit configured to receive the second wireless setting data from the computer by wireless communication in accordance with the wireless setting used in response to the detection unit detection of the signal; and
a setting unit configured to make wireless setting of the device in accordance with the second wireless setting data received by the receiving unit.

2. The communication system according to claim 1, wherein the signal indicates that the computer is running.

3. The communication system according to claim 1, wherein the signal indicates that the computer is in a process of preparing the second wireless setting.

4. The communication system according to claim 1, wherein the computer comprises:
an input unit configured to allow a user to input instruction;
wherein the signal transmission unit outputs the signal in accordance with the instruction inputted by the input unit.

5. The communication system according to claim 1, wherein the computer comprises:
an input unit configured to allow a user to input instruction; and
a setting value generation unit configured to generate the second wireless setting in accordance with the instruction inputted by the input unit.

6. The communication system according to claim 1, wherein the computer comprises an automatic setting value generation unit configured to automatically generate the second wireless setting.

7. The communication system according to claim 6, wherein the automatic setting value generation unit generates the second wireless setting in accordance with a preset wireless setting which is preset to the computer.

8. The communication system according to claim 1, wherein the computer comprises:
a display on which information is displayed; and
a display control unit configured to display information representing a source of the identification data using the identification data transmitted from the device.

9. The communication system according to claim 1, wherein the setting data sending unit is configured such that in response to more than one device returning the identification data to the computer, the setting data sending unit transmits the second wireless setting data to each of the more than one device.

10. The communication system according to claim 1, wherein:
the wireless communication provides a plurality of channels; and
the detection unit detects the signal while switching the plurality of channels from one to another.

11. The communication system according to claim 1, wherein:
the device supports a plurality of wireless communication standards;
the detection unit detects the signal while switching the plurality of channels from one to another.

12. The communication system according to claim 1, wherein the device comprises a device side input unit configured to allow a user to input instruction, and
wherein the detection unit starts to detect the signal in accordance with the instruction inputted by the input unit.

13. The communication system according to claim 1, wherein the device comprises a device side input unit configured to allow a user to input instruction, and
wherein the setting unit starts to make the wireless setting of the device in accordance with the second wireless setting data in response to the instruction being inputted by the input unit.

14. The communication system according to claim 1, wherein the device comprises a state indication unit configured to indicate whether the detection unit of the device is operating.

15. The communication system according to claim 14, wherein the state indication unit further indicates distinctively whether the receiving unit is operating.

16. The communication system according to claim 14, wherein the state indication unit further indicates distinctively whether the detection unit detects the signal output by the computer.

17. The communication system according to claim 14, wherein the state indication unit further indicates distinctively whether the receiving unit receives the second wireless setting data from the computer.

18. A device having a function of performing wireless communication with a computer in a communication system, comprising:
a detection unit configured to detect a signal which is output by the computer and represents at least a source of the signal, while changing a wireless setting for the device, and subsequently to detect a message packet output by the computer by wireless communication;
a replying unit configured to return the identification data of the device to the computer corresponding to the source of the signal in accordance with a wireless setting when the signal and the message packet are detected by the detection unit and not to return the identification data when the signal is detected but the subsequent message packet is not detected by the detection unit;
a receiving unit configured to receive second wireless setting data from the computer in accordance with the wireless setting used in response to the detection unit detection of the signal, after the replying unit transmits the identification data; and
a setting unit configured to make the wireless setting of the device in accordance with the second wireless setting data received by the receiving unit.

19. A non-transitory computer readable-storage medium comprising computer readable instructions stored thereon to cause a computer to perform a method of wireless connection with an external computer in a communication system, comprising the steps of:
detecting a signal which is output by the external computer and represents at least a source of the signal, while changing a wireless setting for the computer and subsequently detecting a message packet output by the external computer by wireless communication;

transmitting identification data of the computer to the external computer corresponding to the source of the signal in accordance with a wireless setting when the signal and the message packet are detected and not transmitting the identification data when the signal is detected but the subsequent message packet is not detected;

receiving second wireless setting data from the external computer in accordance with the wireless setting used in response to the detection of the signal, after transmission of the identification data; and setting the wireless setting of the computer in accordance with the received second wireless setting data.

* * * * *